United States Patent
Bonneau et al.

(10) Patent No.: US 6,657,955 B1
(45) Date of Patent: Dec. 2, 2003

(54) BUFFERING SYSTEM EMPLOYING PER TRAFFIC FLOW ACCOUNTING CONGESTION CONTROL

(75) Inventors: Marie-Claude Bonneau, Gatineau (CA); Tom Davis, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/320,471

(22) Filed: May 27, 1999

(51) Int. Cl.[7] .............................................. G01R 31/08
(52) U.S. Cl. ...................... 370/229; 370/236; 370/412; 710/52
(58) Field of Search .............................. 370/237, 238.1, 370/229, 412, 413, 414, 415, 428, 429; 710/52

(56) References Cited

U.S. PATENT DOCUMENTS

| | | | |
|---|---|---|---|
| 4,511,964 A | * | 4/1985 | Georg et al. |
| 5,014,265 A | * | 5/1991 | Hahne et al. |
| 5,247,634 A | * | 9/1993 | Cline et al. |
| 5,313,454 A | * | 5/1994 | Bustini et al. |
| 5,339,400 A | * | 8/1994 | Iijima |
| 5,541,912 A | * | 7/1996 | Choudhury et al. |
| 5,748,613 A | * | 5/1998 | Kilk et al. |
| 5,748,900 A | * | 5/1998 | Scott et al. |
| 5,784,698 A | * | 7/1998 | Brady et al. |
| 5,790,852 A | * | 8/1998 | Salm |
| 5,860,149 A | * | 1/1999 | Fiacco et al. |
| 5,901,139 A | * | 5/1999 | Shinohara |
| 5,917,805 A | * | 6/1999 | Manning et al. |
| 6,044,418 A | * | 3/2000 | Muller |
| 6,070,202 A | * | 5/2000 | Minkoff |
| 6,144,636 A | * | 11/2000 | Aimoto et al. |
| 6,219,728 B1 | * | 4/2001 | Yin |
| 6,229,789 B1 | * | 5/2001 | Simpson et al. |
| 6,249,819 B1 | * | 6/2001 | Hunt et al. |
| 6,259,698 B1 | * | 7/2001 | Shin et al. |
| 6,377,546 B1 | * | 4/2002 | Guerin et al. |
| 6,405,256 B1 | * | 6/2002 | Lin et al. |
| 6,539,024 B1 | * | 3/2003 | Janoska et al. |

OTHER PUBLICATIONS

Choudhury, A. K.; Halne, E. L. "Dynamic Queue Length Thresholds in a Shared Memory ATM Switch" I.E.E.E., 1996, pp. 679–687.

* cited by examiner

Primary Examiner—Ajit Patel
Assistant Examiner—Steven A Blount
(74) Attorney, Agent, or Firm—Marks & Clerk

(57) ABSTRACT

The method of buffering packets in a digital communications device includes defining an n-level hierarchy of memory partitions, wherein each non-top level partition has one or more child partitions at an immediately lower level of the hierarchy. The memory partitions at the top-most level are pre-configured with a target memory occupancy size, and the target occupancy for each memory partition situated at a lower level is recursively computed in a dynamic manner based on the aggregate congestion of its parent partition, until the target occupancies for the bottom-most memory partitions are determined. Each traffic flow which uses the buffer is associated with one of the memory partitions at the bottom-most level of the hierarchy and packet discard is enabled in the event the actual memory occupancy of a traffic flow exceeds its target occupancy. The memory partitions at higher levels are preferably associated with a group or pool of traffic flows, such as traffic flows associated with a particular egress port and class of service, to thereby selectively control aggregate congestion. The method allows full buffer sharing, the weighted distribution of memory space within a memory partition, and scales easily to large systems.

25 Claims, 10 Drawing Sheets

BUFFERING SYSTEM EMPLOYING PER TRAFFIC FLOW ACCOUNTING CONGESTION CONTROL

FIELD OF THE INVENTION

The invention relates to a method and system for buffering data packets at a queuing point in a digital communications device such as a network node.

BACKGROUND OF THE INVENTION

In order to effect statistical multiplexing in a store and forward digital communications device, such devices will typically queue data packets for subsequent processing or transmission in a common storage resource such as a memory buffer. At such a queuing point, the common storage resource may be shared by traffic stream associated with various quality of service classes, interface ports, and aggregate pools or groups of traffic flows. With traffic of such a multi-faceted nature, such communication devices will often employ some type of congestion control system in order to ensure that the common storage resource is "fairly" allocated amongst the various traffic streams.

For example, in an a synchronous transfer mode (ATM) communication system, the most elemental traffic stream is a virtual connection (VC) which may belong to one of a number of different types of quality of service categories. The ATM Forum Traffic Management working group has defined five (5) traffic classes or service categories, which are distinguished by the parameter sets which describe source behaviour and quality of service (QoS) guarantees. These categories include constant bit rate (CBR), real time variable bit rate (rtVBR), non-real time variable bit rate (nrtVBR), available bit rate (ABR), and unspecified bit rate (UBR) service categories. The ABR and UBR service categories are intended to carry data traffic which has no specific cell loss or delay guarantees. UBR service does not specify traffic related guarantees while ABR services attempts to provide a minimum useable bandwidth, designated as a minimum cell rate (MCR). The ATM Forum Traffic Management working group and International Telecommunications Union (ITU) have also proposed a new service category, referred to as guaranteed frame rate (GFR). GFR is intended to provide service similar to UBR but with a guaranteed minimum useable bandwidth at the frame level, which is mapped to the cell level by an MCR guarantee.

In an ATM device such as a network switch the memory buffer at any given queuing point may be organized into a plural number of queues which may hold data packets in aggregate for VCs associated with one of the service categories. Alternatively, each queue maybe dedicated to a particular VC. Regardless of the queuing structure, each VC represents a traffic flow and groups of VCs, spanning one or more queues, can be considered as "traffic flow sets". For instance, VCs associated with a particular service class or input/output port represent a traffic flow set. When the memory buffer becomes congested, it may be desirable to apportion its use amongst service categories, and amongst various traffic flow sets and the individual traffic flows thereof. In particular, in a network where GFR and ABR connections are contending for buffer space, it may be desired to achieve a fair distribution of the memory buffer between these service categories and between the individual traffic flows or groups thereof.

There are a number of prior art fair buffer allocation (FBA) schemes. One scheme for fairly allocating buffer space Is to selectively discard packets based on policing, For an example of this scheme in an ATM environment, a packet is tagged (i.e., its CLP field is set to 1) if the corresponding connection exceeds its MCR, and when congestion occurs, discard priority is given to packets having a cell loss priority (CLP) field set to zero over packets having a CLP field set to one. See ATM Forum Technical Committee, (Traffic Management working group living list)", ATM Forum, btd-tm-01.02, July 1998. This scheme, however, fails to fairly distribute unused buffer space between connections.

Another scheme is based on multiple buffer fill level thresholds where a shared buffer is partitioned with these thresholds. In this scheme, packet discard occurs when the queue occupancy crosses one of the thresholds and the connection has exceeded its fair share of the buffer. The fair buffer share of a connection is calculated based on the MCR value of the connection and the sum of the MCRs of all active connections utilizing the shared buffer. However, this technique does not provide an MCR proportional share of the buffer because idle (i.e., allocated but not used) buffer, which can be defined as $$\sum_{i=1}^{N} \max\left(0, \frac{MCR_i}{\sum_{active} MCR} Q_s - Q_i\right),$$

where $Q_s$ is the buffer fill level, $Q_i$ is the buffer segment count for a connection i, and $$\frac{MCR_i}{\sum_{active} MCR} Q_s$$

is the fair share of buffer allocated to the connection, is distributed at random between the connections.

Another scheme for fairly allocating buffer space through selective discard is based on dynamic per-VC thresholds. See Choudhury, A. K., and Hahne, E. L., "Dynamic Queue Length Threshold in a Shared Memory ATM Switch", Proceedings of I. E. E. E. Infocom 96, March 1996, pages 679 to 686. In this scheme the threshold associated with each VC is periodically upgraded based on the unused buffer space and the MCR value of a connection Packet discard occurs when the VC occupancy is greater, than the VC threshold. This method reserves buffer space to prevent overflows. The amount of reserved buffer space depends on the number of active connections. When there is only one active connection, the buffer is not fully utilized, i.e., full buffer sharing is not allowed.

The above-mentioned prior art does not fairly distribute unused buffer space between connections or traffic flow groups, and in particular does not provide MCR proportional fair share distribution of the buffer. Some prior art FBA schemes also do not allow for full buffer sharing. Another drawback with some prior art FBA schemes is the fact that the issue of multiple traffic flow groups contending for the same buffer resource is not addressed. The invention seeks to overcome or alleviate some or all of these and other prior art limitations.

SUMMARY OF THE INVENTION

One aspect of the invention relates to a method of partitioning a memory buffer. The method involves defining a hierarchy of memory partitions, including at least E top level and a bottom level, wherein each non-bottom level memory partition consists of one, or more child memory partitions. The size of each top-level memory partition is provisioned, and a nominal partition size for the child partitions of a given non-bottom level memory partition is dynamically computed based on the congestion of the given memory partition. The size of each child memory partition is dynamically computed as a weighted amount of its nominal partition size. These steps are iterated in order to dynamically determine the size of each memory partition at each level of the hierarchy. The memory partitions at the bottom-most level of the hierarchy represent space allocated to (individual or aggregate) traffic flows, and the size of each bottom-level partition represents a memory occupancy threshold for the traffic flow.

The memory partitions are preferably "soft" as opposed to "hard" partitions in that if the memory space occupied by packets associated with a given partition exceeds the size of the partition then incoming packets associated with that partition are not automatically discarded, In the embodiments described herein, each memory partition represents buffer space allocated to a group or set of one or more traffic flows at various levels of granularity. For instance, a third level memory partition may be provisioned in respect of all traffic flows associated with a particular egress port, and a second level memory partition may be associated with a subset of those traffic flows which belong to a particular service category. Therefore, the size of a given partition can be viewed as a target memory occupancy size for the group of traffic flows corresponding to the given partition. At the lowest level of the hierarchy, however, the partition size functions as a threshold on the amount of memory that may be occupied by a (individual or aggregate) traffic flow. When this threshold is exceeded, packet discard is enabled. In this manner, aggregate congestion at higher levels percolate down through the hierarchy to effect the memory occupancy thresholds of individual traffic flows. The net result is the fair distribution of unused buffer space between groups of traffic flows and the individual members thereof.

Another aspect of the invention relates to a method of buffering data packets. The method involves: (a) defining a hierarchy of traffic flow sets, including at least a top level and a bottom level, wherein each non-bottom level traffic flow set comprises one or more child traffic flow subsets; (b) provisioning a target memory occupancy size for each top-level traffic flow set; (c) dynamically determining a target memory occupancy size for each traffic flow set having a parent traffic flow set based on a congestion of the parent traffic flow set; (d) measuring the actual amount of memory occupied by the packets associated with each bottom level traffic flow; and (e) enabling the discard of packets associated with a given bottom level traffic flow set in the event the actual memory occupancy size of the corresponding bottom level traffic flow exceeds the target memory occupancy size thereof.

In the embodiments described herein, the target memory occupancy size for a given traffic flow set is preferably computed by first computing a nominal target occupancy size for the child traffic flow sets of a common parent. The target memory occupancy size for each such child traffic flow is then set to a weighted amount of the nominal target occupancy size, The nominal target occupancy size for a given group of child traffic flow sets preferably changes in accordance with a prespecified function in response to the congestion of their common parent traffic flow set. For instance, the embodiments described herein deploy geometric and decaying exponential functions for computing the nominal target occupancy based on the congestion of a disparity between the target and measured memory occupancy sizes of a traffic flow set.

In the disclosed embodiments the invention is implemented within the context of an-ATM communications system. In these embodiments, the comparison specified in step (f) is carried out prior to or upon reception of the first cell of an ATM adaption layer 5 (AAL5) frame in order to effect early packet discard in accordance with the outcome of the comparison.

The buffering system of the invention scales well to large systems employing many hierarchical levels. This is because there are relatively few state variables associated with each hierarchical level. In addition, most computations may be performed in the background and lookup tables may be used, thereby minimizing processing requirements on time critical packet arrival. The buffering system also enables full buffer sharing, as discussed by way of an example in greater detail below.

BRIEF DESCRIPTION OF THE DRAWINGS

The foregoing and other aspects of the invention will become more apparent from the following description of specific embodiments thereof and the accompanying drawings which illustrate, by way of example only, the principles of the invention, In the drawings, where like elements feature like reference numerals (and wherein individual elements bear unique alphabetical suffixes).

DETAILED DESCRIPTION OF THE PREFERRED EMBODIMENTS

Figure 1:
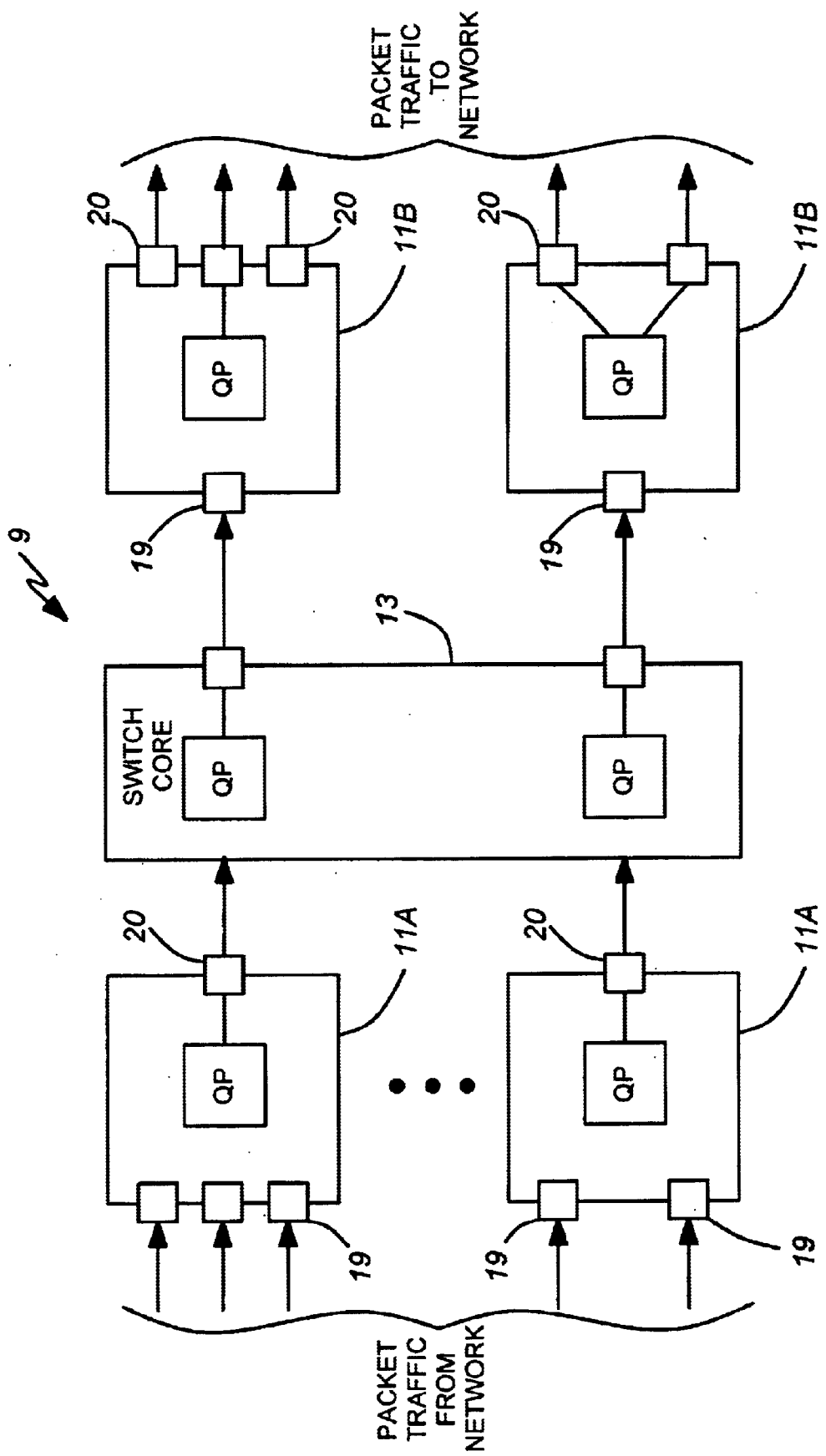
FIG. 1 is a system block diagram of a conventional switch architecture illustrating various queuing points therein.

FIG. 1 is a diagram of the architecture of a conventional network switch or node 9, an example of which is the 36170™ ATM switch manufactured by Newbridge Networks Corporation of Kanata, Ontario, Canada. The node 9 comprises a plurality of ingress and egress line cards 11A and 11B for interfacing with the network (not shown) via physical interface ports. Ingress line cards 11A are configured to receive packet traffic from the network via ingress ports 19 and transmit packets to a switching core 13 via egress ports 20. The switching core 13, as is known in the art, directs each packet to the appropriate egress line cards 11B. These line cards are configured to receive packet traffic from the switching core 13 via ingress ports 19 and transmit packets to the network via egress ports 20.

The line cards 11A and 11B as well as the switching core 13 are each "store and forward" devices and hence present a point, QP, within the node 9 wherein packets are queued in a memory or buffer for subsequent processing by the device (hereinafter "queuing point"). At each queuing point a buffer management system is provided as part of the store and forward functionality.

Figure 2:
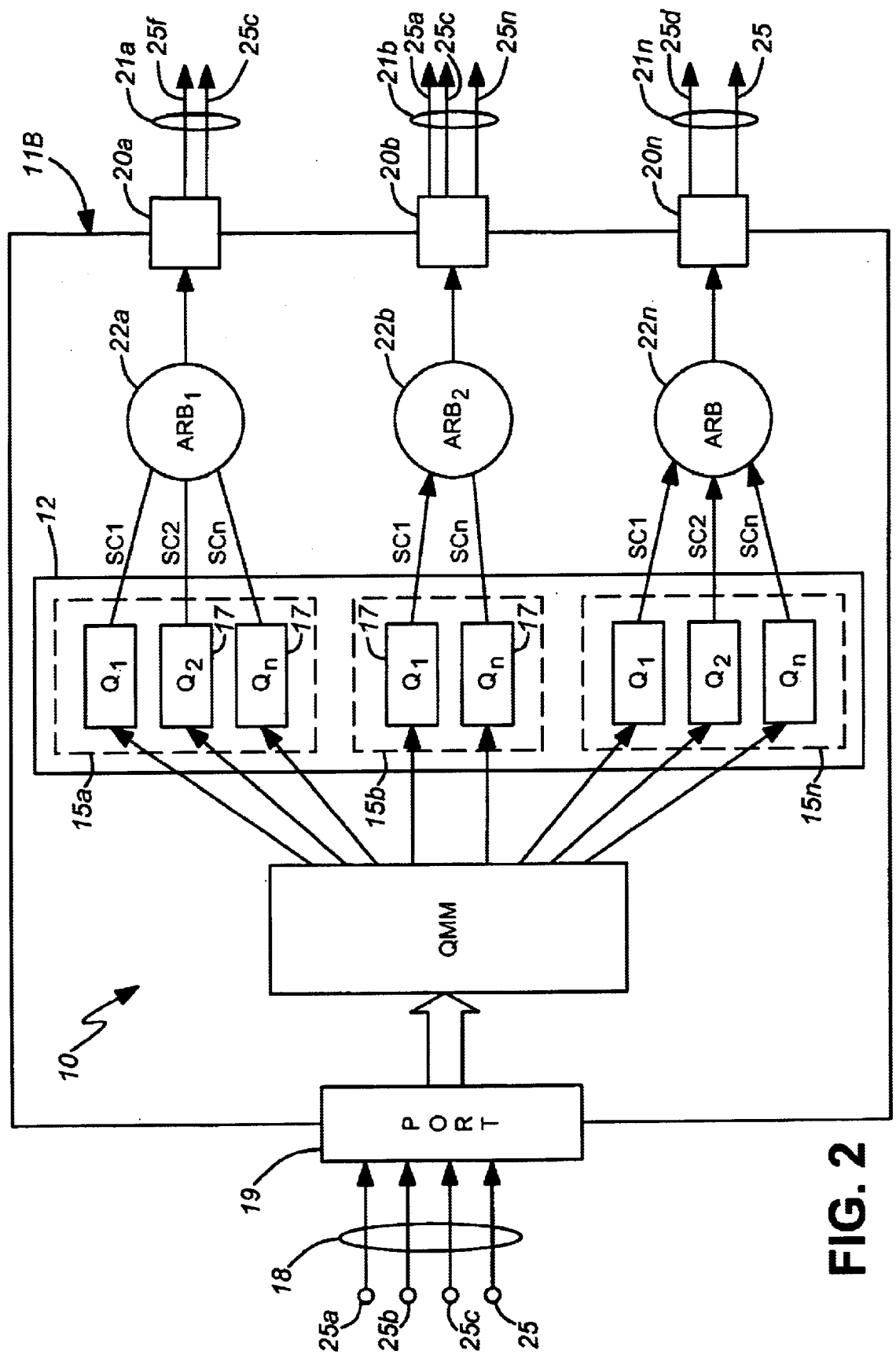
FIG. 2 is a system block diagram of a buffering system according to a first embodiment of the invention employed at one of the queuing points shown in FIG. 1.

FIG. 2 shows an example of a buffer management system 10 employed in egress line card 11B. The system 10 comprises a common storage resource such as a physical memory 12, portions of which are allocated, as subsequently discussed, to various tributaries or logical traffic flows, such as VCs, 25 carried by or multiplexed on aggregate input stream 18. A controller such as queue management module (QMM) 16 organizes and manages the memory 12 according to a selected queuing scheme. In the illustrated embodiment, for example, the QMM 16 employs an aggregate queuing scheme based on service class and egress port. More specifically, the QMM 16 organizes tho memory 12 into multiple sets 15 of logical queues 17. In each set 15 there preferably exists one queue in respect of each service class of the communication protocol. For instance, when applied to ATM communications, each set 15 may comprise six (6) queries 17 in respect of the CBR, rtVBR, nrtVBR, ABR, UBR, and GFR service categories. Alternatively, the packets associated with two or more service categories may be stored in a common queue in which case there may be less than a 1:1 relationship between queue and service category. In any event, the number of sets 15 preferably corresponds to do number of egress ports 20 of the line card 11B, with each set of queues holding packets destined for the corresponding egress port.

Accordingly, as the ingress port 19 receives the packets of aggregate input stream 18, the QMM 16 decides whether to store or discard a given packet based on certain criteria described in greater detail below. If a packet is destined to be stored, the QMM 16 reserves the appropriate amount of memory, associates each packet with the appropriate logical queue 17, and stores the packet in the memory 12. In the illustrated 36170™ switch the function of matching an inbound packet to a given logical queue 17 is based in part on header or address information carried by the packet and stored connection configuration information, but it will be understood that other switches may employ various other mechanisms to provide this capability. Arbiters 22 each multiplex packets from the logical queues 17 to their corresponding egress ports 20 according to a selected service scheduling scheme such as weighted fair queuing (WFQ). When a queue/packet is serviced by one of the arbiters 22, the corresponding memory block is freed, the QMM 16 is notified as to which queue was serviced, and die packet is delivered to the corresponding egress port 20 for transmission over an aggregate output stream 21.

Figure 3:
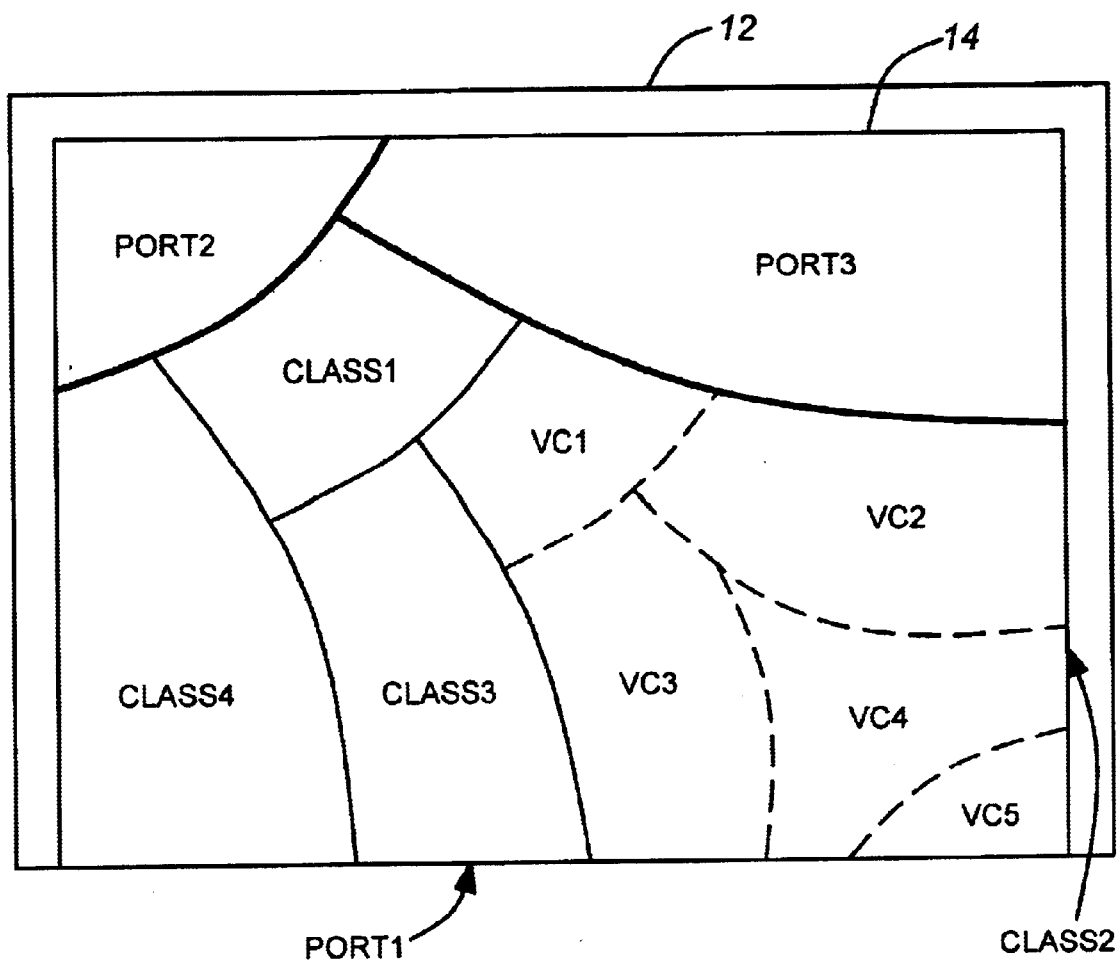
FIG. 3 is a Venn diagram showing how memory is hierarchically partitioned in the first embodiment.
Figure 4:
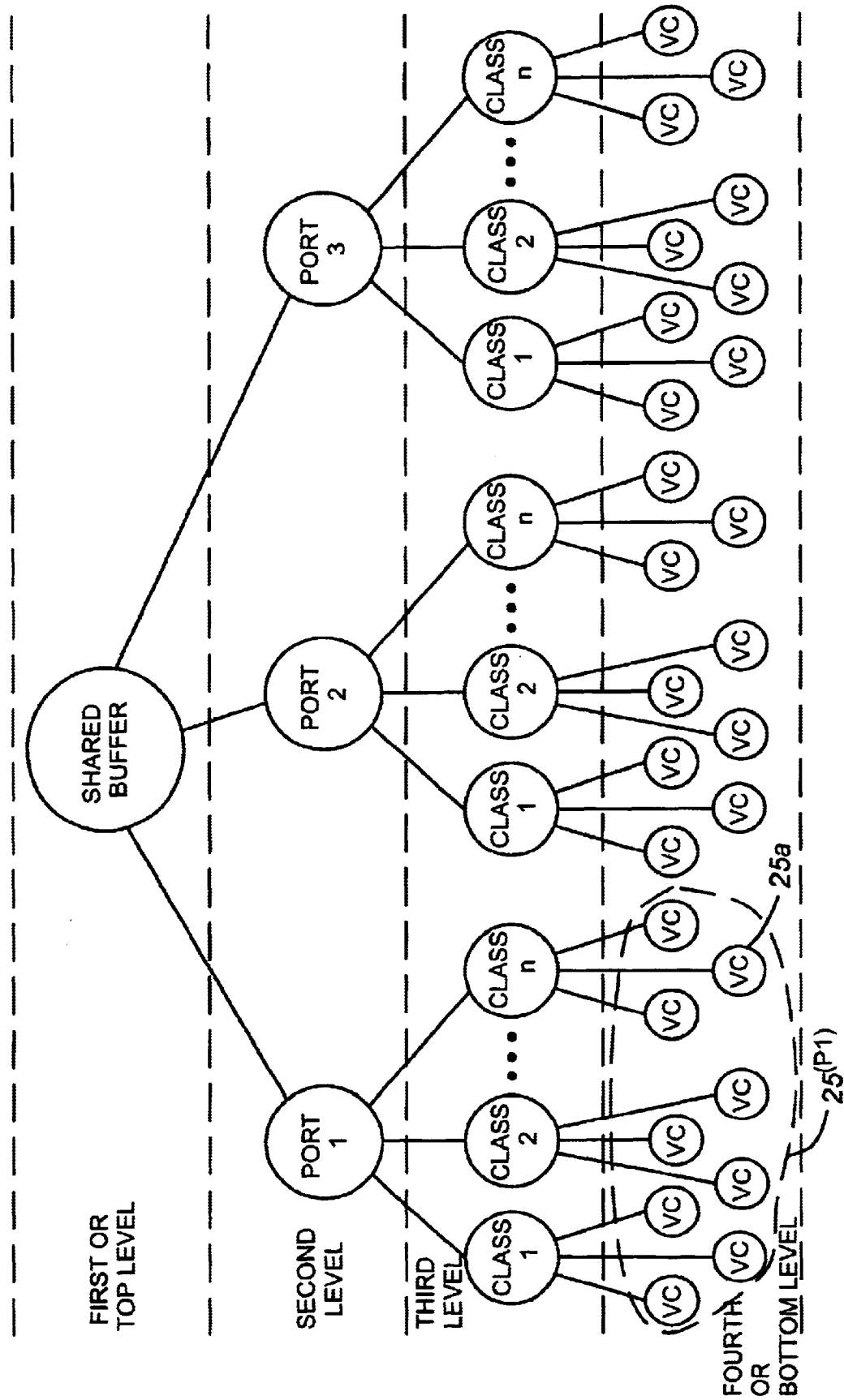
FIG. 4 is a diagram showing the hierarchical partitionment of the memory in the first embodiment in tree form.

The Venn and tree diagrams of FIGS. 3 and 4 show how the physical memory 12 may be partitioned in a hierarchical manner in accordance with the queuing scheme described with reference to FIG. 2. In this example, there are four levels in the hierarchical partitionment of memory 12, At a first or top level, the memory is logically partitioned into a shared buffer space 14 which occupies a subset (less than or equal to) of the amount of fixed physical memory 12. The excess memory space above the shared buffer space represents free unallocated space. At a second level, the memory space allocated to the shared buffer 14 is partitioned amongst the various egress ports 20 of line card 11B. At a third level, the memory space allocated to each egress port is her partitioned into service classes. At a fourth or bottom level, the memory space allocated to each service class is further partitioned amongst individual traffic flows. In the case of ATM communications, these traffic flows may be individual VCs, as shown, such as virtual channel circuits (VCC) and virtual path circuits (VPC), but in 25 other types of communication systems other types of logical packet streams will constitute traffic flows. For instance, in Internet Protocol (IP) networks label switched paths are a form of traffic flow. Similarly, the logical packet streams resulting from the forwarding rules of a packet classifier effectively constitute traffic flows.

In general, at each level of the, hierarchical partitionment of the memory 12 there may exist one or more memory partitions, wherein each such partition is further subdivided into one or more partitions, individually referred to herein as a "child" partition, located on an immediately lower level of the hierarchy. The exception to this, of course, occurs at the bottom-most level of the hierarchy wherein the memory partitions are not further subdivided. Similarly, a partition located at the topmost level of the hierarchy will not have a "parent" partition.

In the present application (i.e., communications systems), since each memory partition (e.g., shared buffer, ports, classes, and VCs) represents memory space notionally allocated to a group or set of one or more traffic flows at various levels of granularity, there also exists a corresponding traffic flow hierarchy. For instance, in the embodiment shown in FIGS. 3 and 4, one fourth, level traffic flow set consists of an individual VC $25a$, and one second level traffic flow set consists of a group of VCs $25^{(P1)}$, including VC $25a$, associated with egress port no. 1 (ref. no. $20a$ in FIG. 2), It will be understood from the present example that a given traffic flow set consists of one or more subset traffic flows, individually referred to herein as a "child" set, located on an immediately lower level of the hierarchy, The exception to this occurs at the bottom-most level of the hierarchy wherein the traffic flow sets, consist of an individual (or aggregate) logical packet stream and will not have any defined subsets. Similarly, a traffic flow set located at the top-most level of the hierarchy will not have a "parent" set.

The memory partitions are "soft" as opposed to "hard" partitions, meaning that if the memory space occupied by packets associated with a given partition exceeds the size of the partition then the QMM 16 does not automatically discard packets associated with that partition. Rather, the size of a given partition can be viewed as a target memory occupancy size for the traffic flow set corresponding to that partition. At the lowest level of the hierarchy, however, the partition size functions as a threshold on the amount of memory that may be occupied by an individual traffic flow. When this threshold is exceeded, the QMM 16 enables packet discard. More specifically, the QMM may be configured to effect packet or cell discard, or to effect early frame or partial frame discard for frame based traffic.

The size of each partition is generally variable and dynamically determined by the QMM 16 in order to control the aggregate congestion of the memory 12. More specifically, at each level of the hierarchy, the aggregate congestion within a given parent memory partition is controlled by computing a nominal partition size that can be applied to each of its child partitions (existing at the immediately next lower level). The value of the nominal partition size for the child partitions of a common parent can be based on a number of factors such as the degree of congestion its rate of change or even the mere existence or non-existence of congestion within the parent partition. Specific embodiments are given below. Regardless of the function, this process is recursively carried out throughout the hierarchy in order to dynamically determine the size for each partition at each level of the hierarchy. In this manner, aggregate congestion at higher levels percolate down through the hierarchy to effect the memory occupancy thresholds for individual traffic flows.

Figure 5:
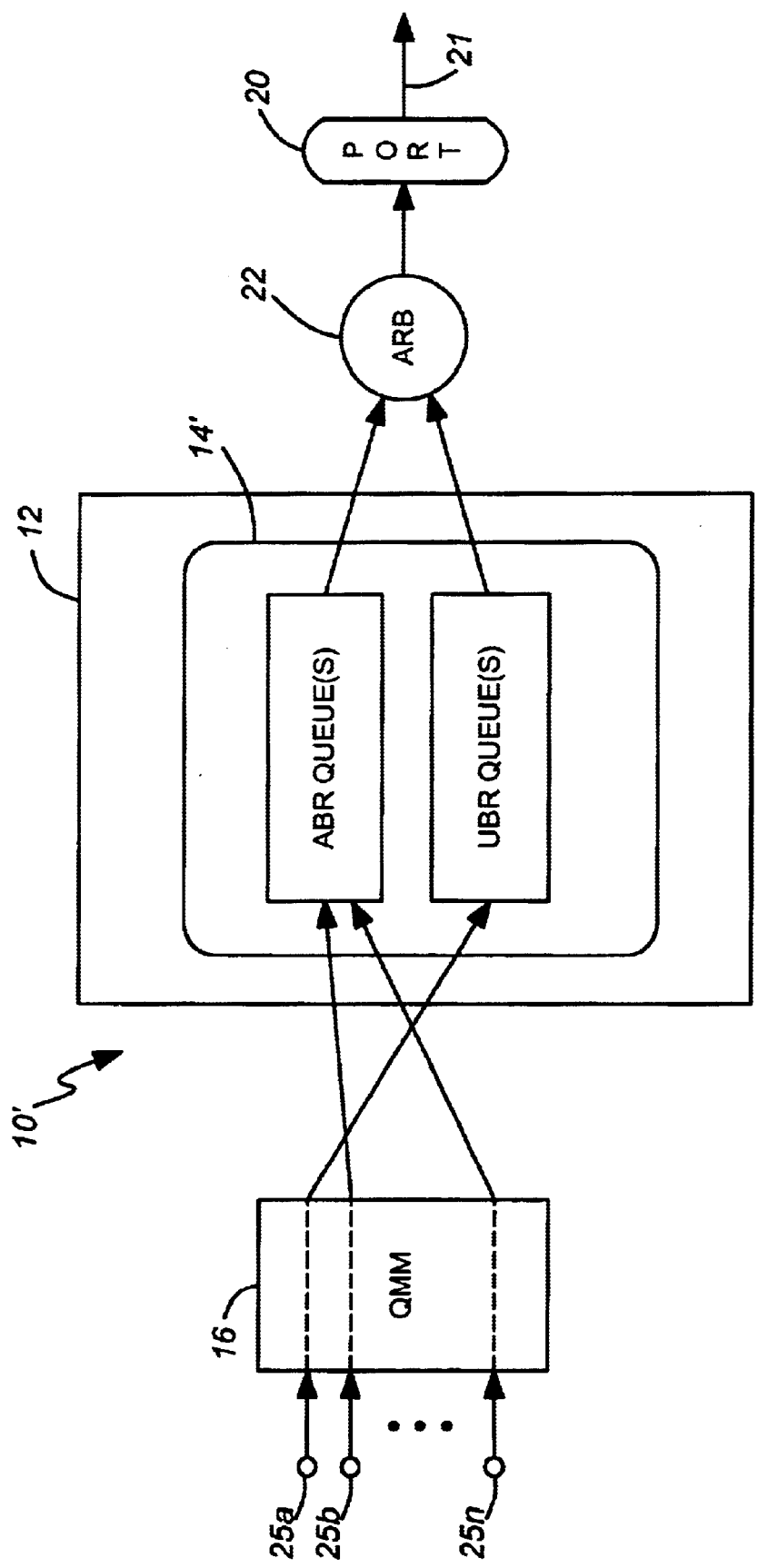
FIG. 5 is a system block diagram of a buffering system according to a second embodiment of the invention.
Figure 6:
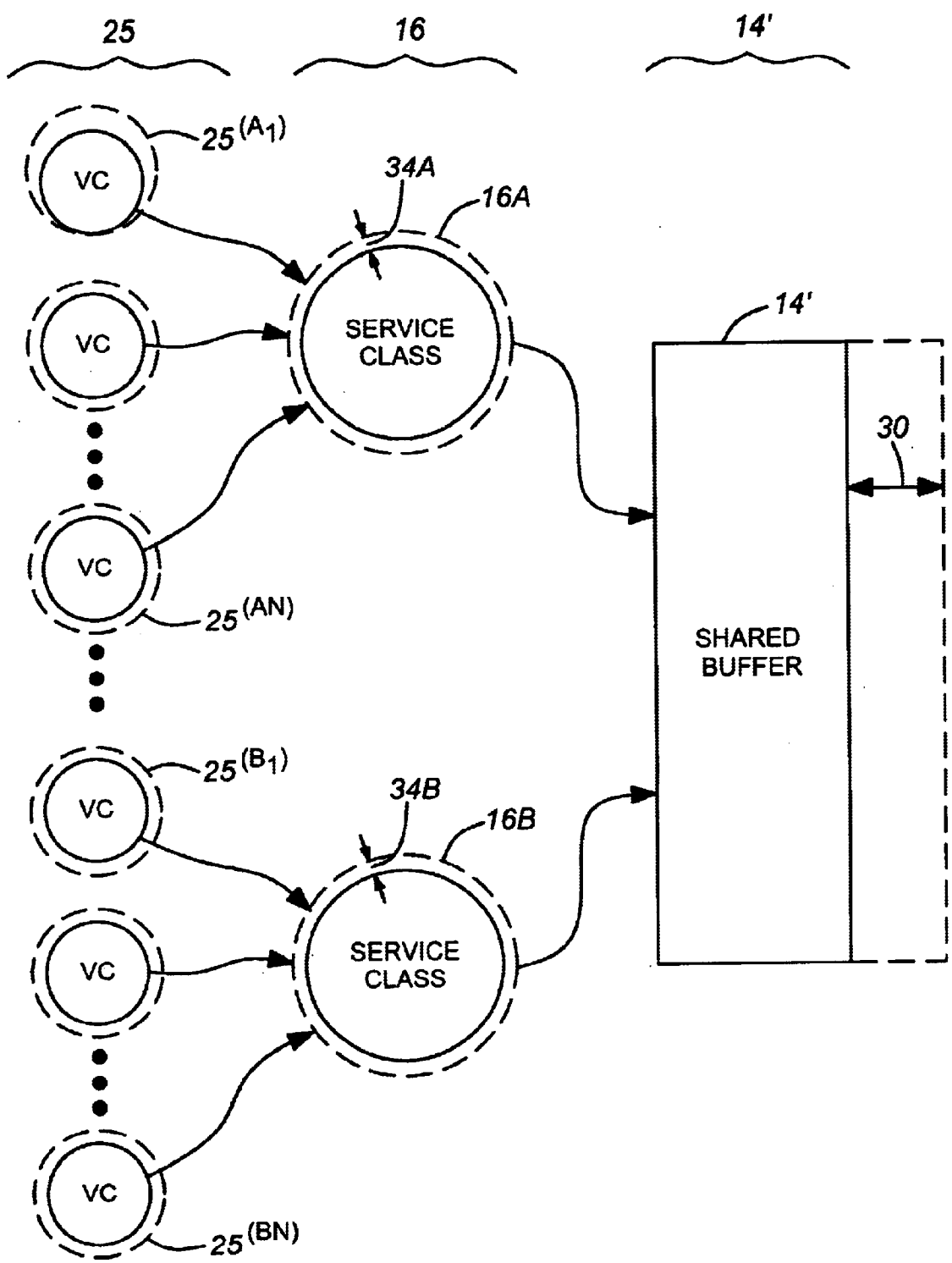
FIG. 6 is a diagram showing, in tree form, how the memory in the second embodiment is hierarchically partitioned.

A second embodiment, implemented in software, is now described in order to illustrate the invention in operation. Referring additionally to FIGS. 5 and 6, this more simplified embodiment is directed toward a single-port buffering subsystem 10' wherein the memory 12 is partitioned into a shared memory buffer 14' provisioned specifically for ATM ABR and UBR traffic, The remaining portion of the memory 12 may be allocated to other ATM service categories, as described previously, or reserved for over-allocation purposes. FIG. 6 shows the hierarchical partitionment of the memory using a tree structure, Since subsystem 10' features only one egress port, no provision has been made in his hierarchy for partitioning the memory amongst egress ports as in the previously discussed embodiment. Thus the hierarchically partitionment of the memory 12 and the corresponding traffic flow hierarchy features only three levels, namely shared buffer 14', service categories 16, and VCs 25.

The following pseudo-code demonstrates the algorithm executed by QMM 16 in this embodiment.

Pseudo-code
Variable Definition
Per Buffer
- TBS—A constant which provides a target size for the buffer, in units of cells.
- B_count—Counter for measuring the total number of cells stored in the buffer, thereby reflecting the amount of shared buffer currently being utilize.
- Last_B_count—A variable for holding the measure of the total number of cells stored in the buffer during a previous iteration.
- TSCS—A control variable which is used to set a target size (in terms of the number of cells) for a service class within the buffer. TSCS varies over time based on a disparity between TBS and B_count, as explained i greater detail below.
- FBS—A constant used to provide a lower bound on TSCS.
- D1, D2 D3 and D4—Constants used to effect a geometric series or progression, as discussed in greater detail below.

Per Service Class
- SC_count [i]—Counter for measuring the number of cells in service class i, thereby reflecting the actual memory occupancy for the service class.
- Last_SC count [i]—A variable for holding the measure of the total number of calls in service class i during a previous iteration.
- $W_{SC}$ [i]—A constant used to specify a weight for service class i.
- TVCS[i]—A control variable which is used to set a target size for a connection within service class i. TVCS[i] varies over time based on a disparity between
- TSCS*wsc[i] and SC_count[i], as explained in greater detail below.
- TCSmin and TCSmax—Constants used to apply minimum and maximum constraints on the value of TVCS [i].

Per Connection
- VC_count[i][j]—Counter for measuring the number of cells stored for connection j of service class i. (Note that the number of connections associated with each service class may vary and hence j may correspondingly have a different range for each value of i.)
- MCR[i][j]—Constant indicative of the MCR or weight of VC j of service class i.
- VCT[i][j]—Variable for the cell discard threshold for connection j of logical VC group i. The cell discard threshold is proportional to the corresponding TVCS [i]; more specifically, VCT[i][J]=TVCS[i]*MCR[i][j].

---

INITIALIZATION:

```
(100)     TSCS := TBS*FBS
(102)     TVCS[i] := 1 ∀ i, i∈{1..N} where N is the number of service classes.
```
PERIODICALLY CALCULATE TSCS:

```
(104)     if ( (B_count > TBS) & (B_count > Last_B_count) ).
(106)         TSCS:= TSCS*(1-D1)
(108)     else if (B_count < TBS)
(110)         TSCS:= TSCS/(1-D2)
(112)     end if
(114)     subject to constraint that TBS*FBS ≦ TSCS ≦ TBS
(116)     Last_B_Count := B_count
```
PERIODICALLY CALCULATE TVCS[i] (∀ i):

```
(118)     if ((SC_count[i] > TSCS*w_sc[i])& (SC_count[i] > Last_SC_count[i]))
(120)         TVCS[i]:= TVCS[i]*(1-D3)
(122)     else if (SC_count[i] < TSCS*w_ac[i])
(124)         TVCS[i]:= TVCS[i]/(1-D4)
(126)     end if
(128)     subject to constraint that TCSmin ≦ TVCS[i] ≦ TCSmax
(130)     Last_SC_Count[i] := SC_count[i]
```
UPON CELL ARRIVAL FOR VC[I][J]:

```
(132)     VCT[i][j] := TVCS[i] * MCR[i][j]
(134)     if( VC_count[i][j] > VCT[i][j] )
(136)         enable EPD
(138)     end if
```

The algorithm involves dynamically computing a target memory occupancy size i.e., memory partition size, for each, traffic flow set. This is symbolized in FIG. 6 by the solid lines used to represent each entity. The actual amount of memory occupied by each traffic flow set is also measured by the algorithm and is symbolized in FIG. 6 by concentric stippled lines. Note that the actual size of memory occupied by any traffic flow set may be less than or greaser than its target size.

The algorithm utilizes current and historical congestion information of a given memory partition/traffic flow set in order to determine the nominal target size for its child sets. Broadly speaking, the algorithm dynamically calculates for each traffic flow set (a) a target memory occupancy size, and (b) a control variable, which represents the nominal target memory occupancy size for the children sets of the present set.

In a the algorithm, which is recursive, the target memory occupancy size is calculated at step (a) for the present traffic flow set by multiplying the control variable computed by its parent by a predetermined weight or factor. These weights, provisioned per traffic flow set, enables each child set of a common parent to have a different target occupancy.

The value of the control variable calculated at step (b) de on the congestion of the present traffic flow set. In the algorithm, congestion is deemed to exist when the target memory occupancy size exceeds the actual memory occupancy size of a given set. At each iteration of the algorithm, the value of the control variable is decreased if congestion currently exists and if the traffic flow set previously exhibited congestion. This historical congestion information is preferably based on the last iteration of the algorithm. Conversely, the value of the control variable increases if no congestion exists for the traffic flow set. Thus, in this embodiment, the target occupancy for the child sets of a common parent are based on a disparity between the target and actual memory occupancies of the parent.

Steps (a) and (b) are performed for each traffic flow set at a particular level to calculate the respective target occupancies for the child sets thereof at the next lower level of the hierarchy. Another iteration of these steps is performed at the next lower level, and so on, until target occupancies are calculated for the traffic flows at the bottom-most level of the hierarchy.

For instance, the target occupancy for service classes 16A and 16B is based on a disparity 30 between the target and measured occupancy of shared buffer 14'. Similarly, the target occupancy for each VC $25^{(A1)}$ to $25^{(AN)}$ is based on a disparity 34A between the target and measured occupancy of service class 16A. When an AAL frame or cell is received, the algorithm identifies the corresponding VC and determines whether its actual memory occupancy exceeds the target memory occupancy size thereof in which case the frame or cell is subject to discard. In this manner congestion at higher levels of the traffic flow hierarchy percolates through the cascaded hierarchical structure to effect the thresholds of individual connections.

Referring additionally to the pseudo-code, TBS represents the target memory occupancy size for buffer 14. TBS is a fixed value at the highest level. TSCS represents a nominal target size for all service classes 16, and TSCS*$w_{SC}$[i] represents the target size for a particular service class. The factor $w_{SC}$[i] is the weight applied to a particular service class in order to allow different classes to have various target occupancy sizes. Similarly, TVCS[i] represents a nominal target size for the VCs 25 within a particular service class i, and TVCS[i]*MCR[i][j], which is equal to VCT[i][j], represents the target size as well as the cell discard threshold, for a particular VC. The factor MCR[i][j] provides MCR proportional distribution of buffer space within a service class. TSCS and the values for each TVCS[i] and VCT[i][j] are periodically computed and thus will generally vary over time.

A variety of counters (B_Count, SC_Count [i], VC_Count [i][j]) are employed to measure the actual memory occupancy size of the various traffic flow sets. These are updated by the QMM 16 Whenever a cell, i.e., a fixed size packet used in ATM systems, is stored or removed from buffer 14. (The updating of counters is not explicitly shown in the pseudo-code.)

Lines 100–102 of the pseudo-code initialize TSCS and TVCS[i] ∀ i. TSCS is initialized to a target size of TBS*FBS. FBS is preferably equal to 1/N, where N is the number of service classes 16 within shared buffer 14'. This has the effect of initially apportioning the memory buffer equally amongst each service class. Other initialization values are also possible. TVCS[i] is initialized to 1 for each connection, as a matter of convenience.

Lines 104–116 relate to the periodic calculation of TSCS. Line 104 tests whether the actual occupancy of shared buffer 14' is greater than its target occupancy and is increasing. If so then at line 106 TSCS is geometrically decreased by a factor of 1−D1, where 0<D1<1, e.g., 0.1. Line 108 tests whether the actual occupancy of shared buffer 14' is less than its target size, If so then at line 110 TSCS is geometrically increased by a factor of 1/(1−D2), where 0<D2<1 e.g., 0.05. The values of D1 and D2 are preferably selected such that when the target occupancy deceases it does so at a faster rate than when it increases, as exemplified by the respective values of 0.1 and 0.05. Those skilled in this art will appreciate that D1 and D2 control how fast the system responds to changes of state and that some degree of experimentation in the selection of suitable values for D1 and D2 may be required for each particular application in order to find an optimal or critically damped response time therefor.

Line 114 constrains TSCS to prescribed maximum and minimum limits of TBS and TBS*FB respectively. The maximum limit prevents service classes from attaining a target occupancy value beyond the availability of the shared buffer. The minimum limit bounds TSCS to ensure that it does not iterate to values that would cause convergence times to suffer.

Lines 118–130 relate to the periodic calculation of TVCS [i] in relation to service class i. Line 118 tests whether the actual occupancy size of service class i is greater than its target size and is increasing. If so then at line 120 TVCS[i] is geometrically decreased by a factor of 1−D3, where 0<D3<1, e.g., 0.1. Line 122 tests whether the actual size of service class i is less than its target size. If so then at line 124 TVCS[i] is geometrically increased by a factor of 1/(1−D4), where 0<D4<1, e.g., 0.05. The values of D3 and D4 are preferably selected such that when TVCS[i] decreases it does so at a faster rate than when it increases, as exemplified by the respective values of 0.1 and 0.05.

Line 128 constrains TVCS[i] to prescribed maximum and minimum limits to ensure that convergence times are not excessive. TCSmax is preferably equal to TBS/LR, where LR is the line rate of the corresponding output port. This upper bound also ensures that a connection can never receive more than TBS buffer space. TCSmin is preferably equal to TBS/MCRmin, where MCRmin is the minimum MCR of all connections. This provides a conservative lower bound.

In this embodiment the QMM 16 effects early packet discard (EPD), and thus lines 132–138 are actuated when a start-of-packet (SOP) cell is received by the QMM 16. (In the AAL5 ATM adaption layer protocol the end of packet (EOP) cell signifies the start of the next packet.) The target memory occupancy size or threshold for VC j of service class i is evaluated at line 132 when a SOP cell is received. The threshold is equal to TVCS[i] multiplied by the MCR of the connection. As mentioned earlier, this provides for MCR proportional distribution of the buffer space allotted to service class i. Line 134 tests whether the number of cells stored for VC j exceeds VCT[i][j], its target occupancy. If so, then EPD is enabled at line 136 and the QMM 16 subsequently discards all cells associated with the AAL5 frame. Lines 132 to 138 are re-executed upon the arrival of the next SOP cell. In the alternative, the system may effect a partial packet discard (PPD) policy. Alternatively still, line 136 may be modified to effect cell discard per se, with lines 132–138 being executed upon the arrival of each cell.

This embodiment is readily scalable to systems having a large number of service classes and connections since there are relatively few state variables associated with the shared buffer and the service classes. In addition, most computations may be performed in the background, thereby minimizing processing requirements on time critical cell arrival.

This embodiment also allows full buffer sharing. To see why this is so, consider an extreme case where all VCs associated with service class 16B cease transmitting cells in this case, the shared buffet 14' begging to rapidly empty, causing the measured buffer size to be significantly smaller than the target buffer size. This causes the target sizes for service classes 16A and 16B to increase up to a level of TBS, the target size of the buffer. In turn, TVCS[i] for all connections rises to an amount which enables the service category occupancy to reach TBS. Consequently, the entire buffer becomes available to all of the transmitting connections of service class 16A and full buffer sharing is achieved. Moreover, it will be noted that each VC $25^{(A1)}$ to $25^{(AN)}$ of service class 16A receives a share of the buffer space allotted to that service class in proportion to the MCR of the connection. Consequently, the instantaneously unused buffer space of service class 16A is distributed in proportion to the MCRs of the connections within the service class.

The method of allocating buffer space has been particularly described with reference to the three level traffic flow hierarchy as shown in FIG. 6. Those skilled in the art will understand that the method can be applied with respect to an n-level traffic flow hierarchy.

Figure 7:
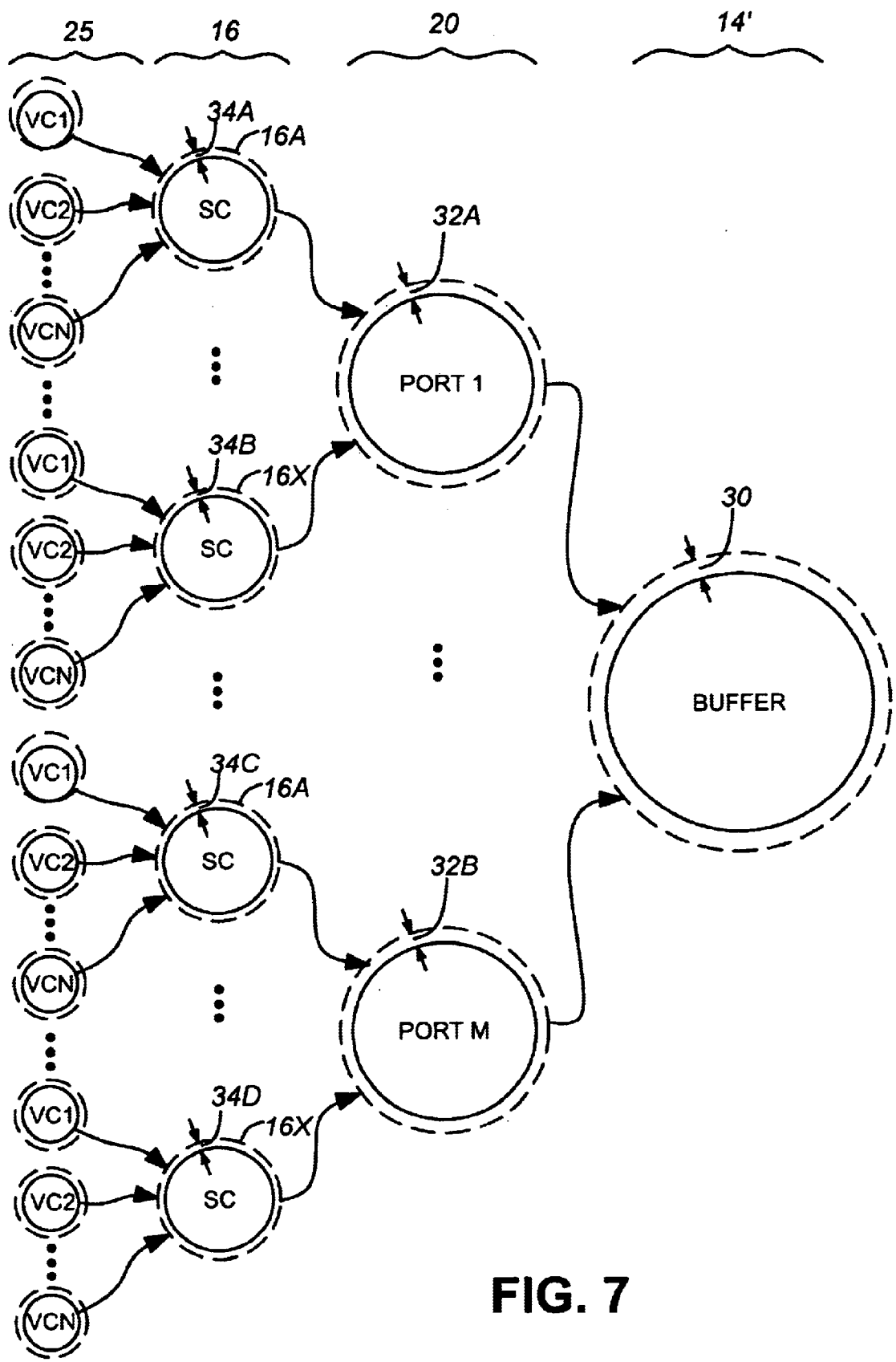
FIG. 7 is a diagram showing, in tree form, an alternative approach to the hierarchical partitionment of the memory in the second embodiment

For example, FIG. 7 shows a four level hierarchy wherein the memory 12 of the second embodiment is partitioned amongst multiple egress ports 20. The level of the port partitions are disposed between the levels for the shared buffer 14' and service classes 16. in tis hierarchy, the target memory occupancy size for each port 20 is based on the disparity 30 between the target and measured memory occupancy sizes of shared buffer 14', and the target sizes for the service classes 16 associated with a given port are based on a disparity 32A or 32B between target and measured memory occupancy sizes of the given port. More specifically, let g{x,y} represent a discrete or iterative function wherein if x>y and x is increasing then g{x,y} geometrically decreases and if x<y then g{x,y} increases. The nominal target occupancy sizes for the various entities in the hierarchy shown in FIG. 3 can be:

TBS=constant,
TPS=g{B_count, TBS},
TSCS[i]=g{P_count[i], $w_P$[i]*TPS},
TVCS[i,j]=g{SC_count[i,j], $w_{SC}$[i,j]*TSCS[i]}, and
VCT[i,j,k]=TVCS[i,j]*MCR[i,j,k].

In the forgoing, TPS represents a nominal memory occupancy for ports and $w_P$ is a weight associated with each port i. The product $w_P$[i]*TPS represents the target size for each particular port, which need not be equal. Similarly, $W_{SC}$[i,j]*TSCS[i] represents the target size for a particular service class j associated with port i.

It should also be noted that g{x,y} may alternatively provide progressions other than geometric, including but not limited to linear, hyperbolic, logarithmic or decaying exponential progressions. Each type of progression will provide different convergence characteristics. Also, g{x,y} need not necessarily consider historical congestion information.

Figure 8:
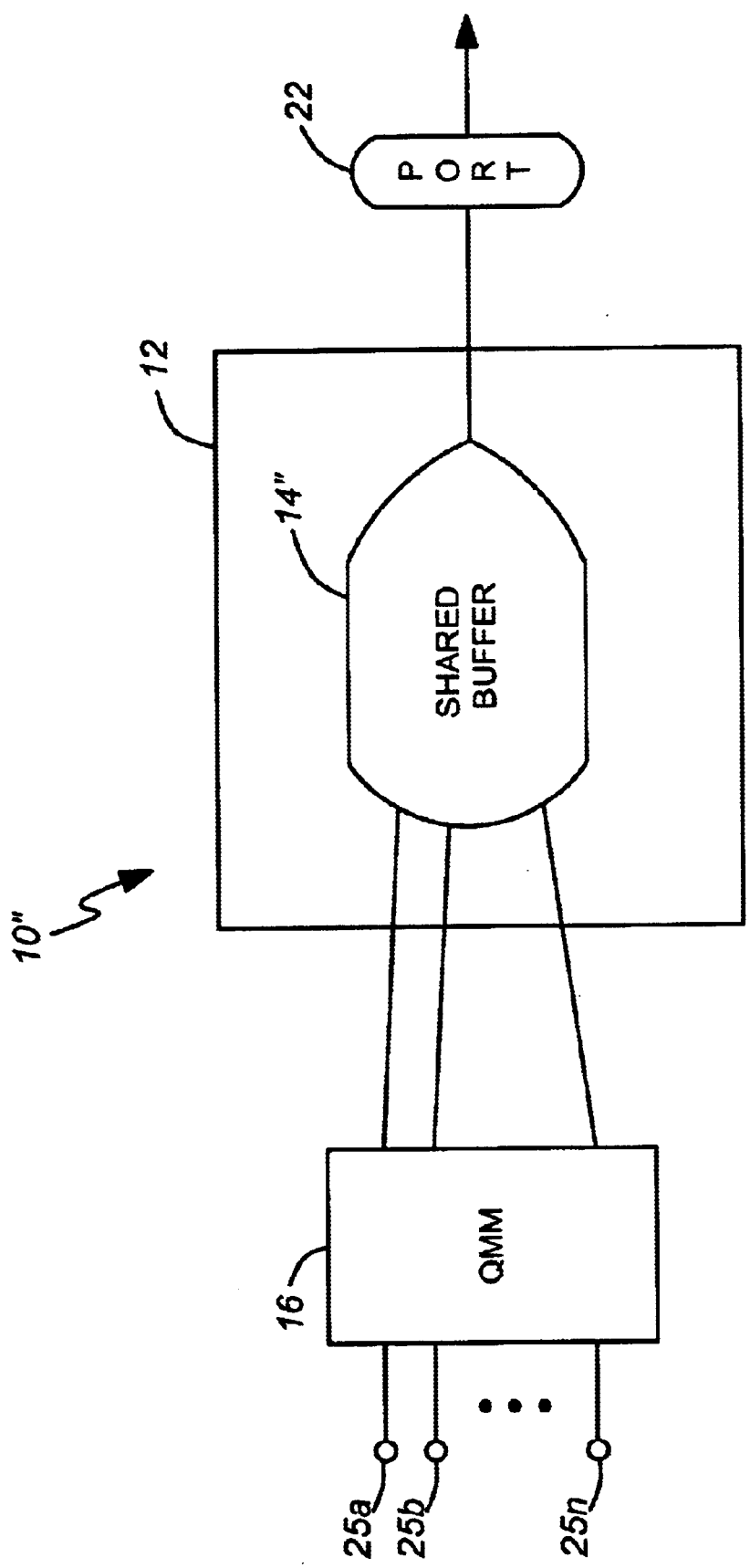
FIG. 8 is a system block diagram of a buffering system according to a third embodiment of the invention.
Figure 9:
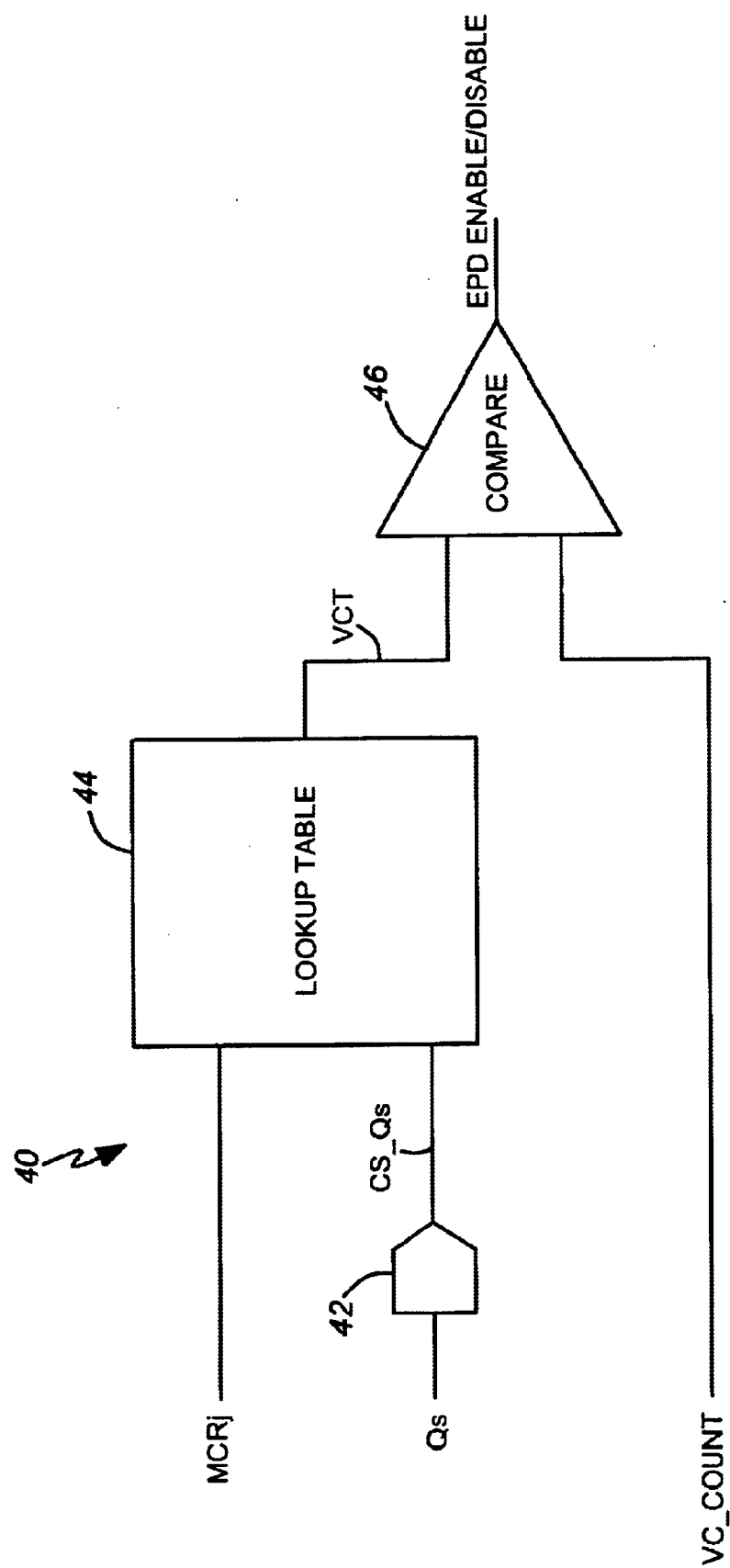
FIG. 9 is a hardware block diagram of a portion of the buffering system of the third embodiment.
Figure 10:
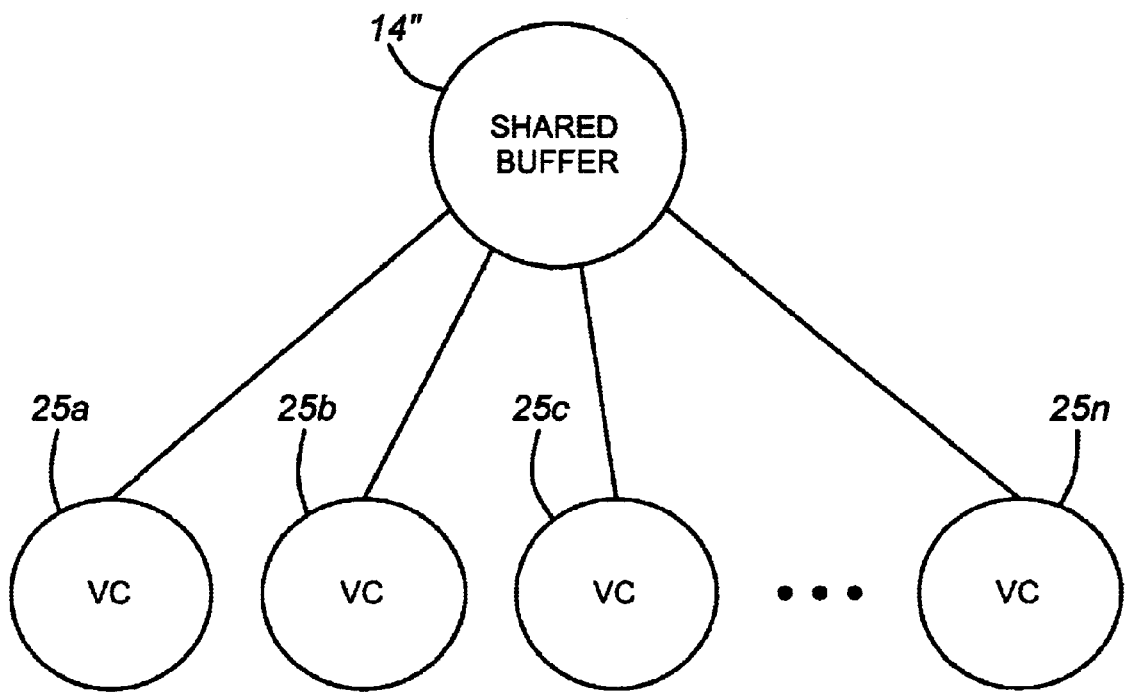
FIG. 10 is a diagram showing, in tree form, how the memory of the third embodiment is hierarchically partitioned.

For example, FIGS. 8–10 show another embodiment of the invention, implemented in hardware, which only considers current congestion. This embodiment is directed toward a buffering subsystem 10" wherein the physical memory 12 is partitioned into a shared memory buffer 14" provisioned for only one of ABR and UBR traffic, or alternatively for traffic from both classes. The remaining portion of the memory 12 nay be allocated to other ATM service categories, as described previously, or reserved for over-allocation purposes. FIG. 10 is a tree diagram showing the hierarchical partitioning of the memory for this queuing scheme. Since the subsystem 10" features only one egress port and no partitionment amongst service classes, the memory partitionment and corresponding traffic flow hierarchy only has two levels, namely shared buffer 14" and VCs 25.

FIG. 9 shows hardware 40 incorporated within the QMM 16 of this embodiment for determining whether to enable or disable packet discard. The hardware 40 comprises three inputs, as follows:

| | |
|---|---|
| Qs: | A counter in respect of the total number of cells occupying the shared buffer 14", thereby reflecting the actual occupancy size of the shared buffer. This counter is incremented/decremented by the QMM 16 upon cell arrival/departure. |
| VC-Count j: | A counter in respect of thc total number of cells occupied by VC j. This counter is incremented/decremented by the QMM 16 upon the arrival/departure a cell belonging to VC j. |
| MCR j: | The MCR value of VC j. |

The QMM 16 utilizes the hardware 40 whenever an end of packet cell (of an AAL frame) arrives, in which case congestion control is executed. The Qs counter or variable is fed to a quantizing function 42 which produces a quantized congestion variable CS-Qs, having a pre-specified range of values, e.g., 0 to 2047 (i.e., an 11 bit quantity). The quantization function maps Qs to CS_Qs based on the line rate of the egress port 20. For example, for a given value of Qs, an egress port having a line rate of 1.6 Mb/s will map onto a lower quantized value CS_Qs than an egress port having a line rate of 800 kb/s. Table 1 below shows an example of this mapping for some common standardized line rates where the pre-provisioned target size for the shared buffer 14" is 32k cells.

TABLE 1

| Qs | | | |
|---|---|---|---|
| DS-3/E-3 | QC-3 | OC-12 | CS_Qs |
| [12284, 32k] | [28664, 32k] | [24568, 32k] | 2047 |
| ... | ... | ... | . |
|  |  |  | . |
|  |  |  | . |
| [4100,4103] | [12296,12303] | [8200,8207] | 1 |
| [0,4099] | [0,12295] | [0,8199] | 0 |

It should be appreciated that CS_Qs thus corresponds to a disparity between the target and actual memory occupancy of the shared buffer 14". It should also be noted that the function which measures congestion differs depending on the line rate of the egress port.

The target memory occupancy or threshold, VCT, for a connection j featuring an EOP cell is computed by multiplying the MCR of the connection by a predetermined value selected from a lookup table 44 based on the quantized shared buffer congestion variable CS_Qs. The lookup table 44 provides in effect pre-computed values of a pre-determined function. Table 2 shows an example of such a pre-determined function in respect of an OC-12 egress port.

TABLE 2

| Decimal Value of CS_Qs (Input) | VCT (Output) |
|---|---|
| [0, 488] | $MCR_j \times 120.96$ |
| [489, 1697] | $MCR_j \times 120.96 \times 0.9926094^{(CS\_Qs-488)}$ |
| [1698, 2,047] | 0 |

This table provides a decaying exponential function when CS-Qs is in the range of 489–1697; a maximum value of 120.96 when CS_Qs is in the range of 0–488, wherein the shared buffer is relatively uncongested; and a minimum value of 0 when CS_Qs is in the range of 1698–2047, wherein the shared buffer is deemed to be very congested.

When the end of packet cell arrives, a comparator 46 compares the memory occupancy threshold of the VC, i.e., VCT, against VC_count[j], and if be latter is greater than the former an EPD signal 48 is enabled. Otherwise the EOP cell is stored and the EPD signal 48 is disabled.

Those skilled in the art will understand that while the embodiments described herein have disclosed two, three and four level memory partition/traffic flow hierarchies, far more elaborate hierarchies may be constructed. Other possible hierarchies include (from top level to bottom level):

buffer, port, service category, groups of virtual circuits, individual virtual circuits;

buffer, port, service category, queue, virtual circuit;

buffer, port, service category, virtual path aggregation (VPA), and virtual circuit;

buffer, port, service category, virtual private network (VPN), and virtual circuit;

buffer, port, service category, VPN, VPA, and virtual circuit.

Similarly, those skilled in the art will appreciate that numerous modifications and variations may be made to the preferred embodiment without departing from the spirit of the invention.

What is claimed is:

1. A method of partitioning a memory buffer, comprising:
   (a) defining a hierarchy of memory partitions, said hierarchy including at least a top level and a bottom level, wherein each non-bottom level memory partition consists of one or more child memory partitions, and each non-top level memory partition has a parent memory partition;
   (b) provisioning the size of each top-level memory partition;
   (c) dynamically computing a nominal partition size for the child partitions, of a given non-bottom level memory partition based on the congestion of the given non-bottom level memory partition;
   (d) dynamically computing the size of each child memory partition based on a pre-provisioned weight of the nominal partition size computed in step (c); and
   (e) iterating steps (c) and (d) in order to dynamically determine the size of each memory partition at each level of the hierarchy;
   wherein the memory partitions at the bottoms level of the hierarchy represent memory space allocated to a traffic flow set and the size of the bottom level partition represents a memory occupancy threshold for the traffic flow of the corresponding traffic flow set.

2. The method according to claim 1, wherein the nominal partition size for a given group of child memory partitions increases if the parent memory partition is not congested and decreases if the parent memory partition is congested.

3. The method according to claim 1, wherein each memory partition is associated with a pre-determined collection of packets and the congestion of a given memory partition is correlated to a disparity between the size of the given memory partition and the actual memory occupancy size of the corresponding collection of packets.

4. The method according to claim 1, wherein the congestion of a given memory partition for the purpose of computing a nominal partition size in step (c) is based on current and hisortical congestion of the given memory partition.

5. A method of buffering packets in a communications device, the method comprising:
   (a) defining a hierarchy of traffic flow sets, wherein the hierarchy includes at least a top level and a bottom level, and each non-bottom level traffic flow set comprises one or more child traffic flow subsets;
   (b) provisioning a target memory occupancy size for each top-level traffic flow set;
   (c) dynamically determining a target memory occupancy size for each traffic flow set having a parent traffic flow set based on a congestion of the parent traffic flow set;
   (d) measuring the actual amount of memory occupied by the packets associated with each bottom level traffic flow; and
   (e) enabling the discard of packets associated with a given bottom level traffic flow set in the event the actual memory occupancy size of the corresponding bottom level traffic flow exceeds the target memory occupancy size thereof.

6. The method according to claim 5, wherein each non-top level traffic flow set is a subset of a traffic flow set located on an immediately higher level of the hierarchy and each non-bottom level traffic flow set is a superset of at least one traffic flow set located on an immediately lower level of the hierarchy.

7. The method according to claim 6, including measuring the actual amount of memory occupied by each traffic flow set of the hierarchy.

8. The method according to claim 7, wherein step 5(c) includes computing a nominal target occupancy size for all the child traffic flow sets of a common parent and provisioning each such child traffic flow set with a weight, wherein the target memory occupancy size of each such child traffic flow set is a weighted amount of the nominal target occupancy size.

9. The method according to claim 8, wherein the nominal target occupancy size for a group of child traffic flow sets having a common parent changes in accordance with a prespecified function in response to the congestion of the common parent traffic flow set.

10. The method according to claim 9, wherein congestion is correlated to a disparity between the target and measured memory occupancy sizes of a traffic flow set.

11. The method according to claim 7, wherein the target memory occupancy size for each non-top level traffic flow set changes in accordance with a prespecified function in response to a disparity between the target and measured memory occupancy sizes of its parent traffic flow set.

12. The method according to claim 11, wherein the target memory occupancy size for a non-top level traffic flow is limited to a prespecified range.

13. The method according to claim 12, wherein the target memory occupancy size for a non-top level traffic flow set
   (a) decreases up to a minimum limit if the measured memory occupancy size of its parent traffic flow set is increasing and exceeds the target size thereof, and
   (b) increases to a maximum limit if the actual memory occupancy size of its parent traffic flow set is less than the target size thereof.

14. The method according to claim 5, wherein a bottom level traffic flow set comprises an individual traffic flow selected from the group consisting of: a virtual connection; a label switched path; and a logical stream of packets resulting from the forwarding rules of a packet classifier.

15. A method of processing packets at a queuing point in a communications device, the method comprising:
   receiving and associating each packet with a traffic flow, said traffic flow being associated with a bottom level in a multi-leveled hierarchy of traffic flow sets also having a top level, wherein each non-top level traffic flow set is a subset of a traffic flow set located on a higher level of the hierarchy and each non-bottom level traffic flow set is a superset of at least one traffic flow set located on a lower level of the hierarchy;
   dynamically determining a target memory occupancy size for each non-top level traffic flow based on congestion of the corresponding traffic flow superset, wherein the target memory occupancy size is prespecified for each top-level traffic flow set;
   and subjecting a given packet to the possibility of discard in the event the measured memory occupancy size of the corresponding traffic flow exceeds the target memory occupancy size thereof and storing the given packet otherwise.

16. The method according to claim 15, wherein the target memory occupancy size for a non-top level traffic flow changes in accordance with a prespecified function in response to a disparity between the target and measured memory occupancy sizes of the corresponding traffic flow superset.

17. The method according to claim 16, wherein the target memory occupancy size for each non-top level traffic flow is limited to a prespecified range.

18. The method according to claim 17, wherein the target memory occupancy size for a given non-top level traffic flow
   (a) decreases up to a minimum limit if the measured memory occupancy size of the corresponding traffic flow superset is increasing and exceeds its target size, and
   (b) increases to a maximum limit if the actual memory occupancy size of the corresponding traffic flow superset is less than its target size.

19. The method according to claim 15, wherein a traffic flow consists of one of: a virtual connection; a label switched path; and a logical stream of packets resulting from forwarding rules in a packet classifier.

20. A method of buffering packets in a connection-orientated communications device, the method comprising:
   defining a hierarchy of plural partitions in a memory buffer and associating each connection which uses the memory buffer with one of the memory partitions;
   providing the memory buffer with a target memory occupancy;
   dynamically determining a target memory occupancy for each memory partition based on a disparity between the actual memory occupancy and the target memory occupancy of the buffer;
   dynamically determining a target memory occupancy for each connection based on a disparity between an actual memory occupancy and the target memory occupancy of the corresponding memory partition; and
   enabling packet discard in the event the actual memory occupancy of a connection exceeds its target memory occupancy.

21. The method according to claim 20, wherein the target memory occupancy size for a given memory partition decreases up to a minimum limit if the actual memory occupancy of the buffer exceeds it targets occupancy and increases to a maximum limit if the actual memory occupancy of the buffer is less than its target occupancy.

22. The method according to claim 21, wherein the target memory occupancy for a given connection decreases up to a minimum limit if the actual memory occupancy of the corresponding memory partition exceeds its target occupancy and increases to a maximum limit if the actual memory occupancy of the corresponding memory partition is less than its target occupancy.

23. The method according to claim 22, wherein said device employs an a synchronous transfer (ATM) mode communications protocol and said packets are ATM cells.

24. The method according to claim 23, wherein the actual memory occupancy of a connection is compared against its target occupancy immediately prior to or upon reception of the first cell of an ATM adaption layer (AAL) frame and early frame discard is effected in accordance with the outcome of the comparison.

25. The method according to claim 24, wherein the ATM cells are associated with ATM service categories which specify a minimum cell rate (MCR) traffic characteristic, and the target memory occupancy for a given connection is weighted by its MCR within the corresponding memory partition.

* * * * *